No. 846,854. PATENTED MAR. 12, 1907.
L. A. JONES.
SHEARS.
APPLICATION FILED MAY 10, 1906.
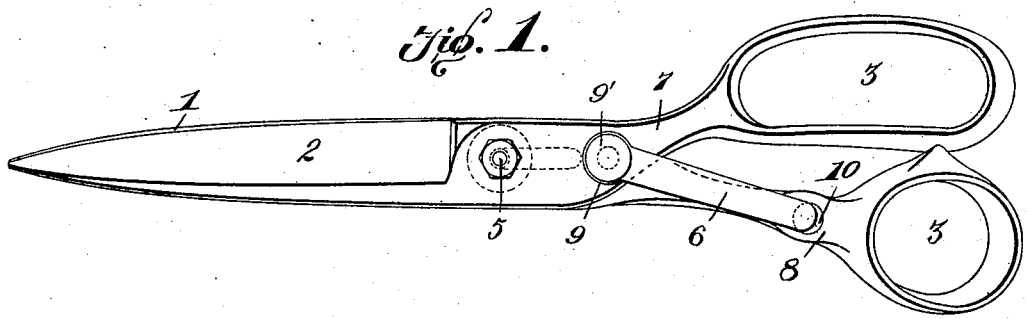
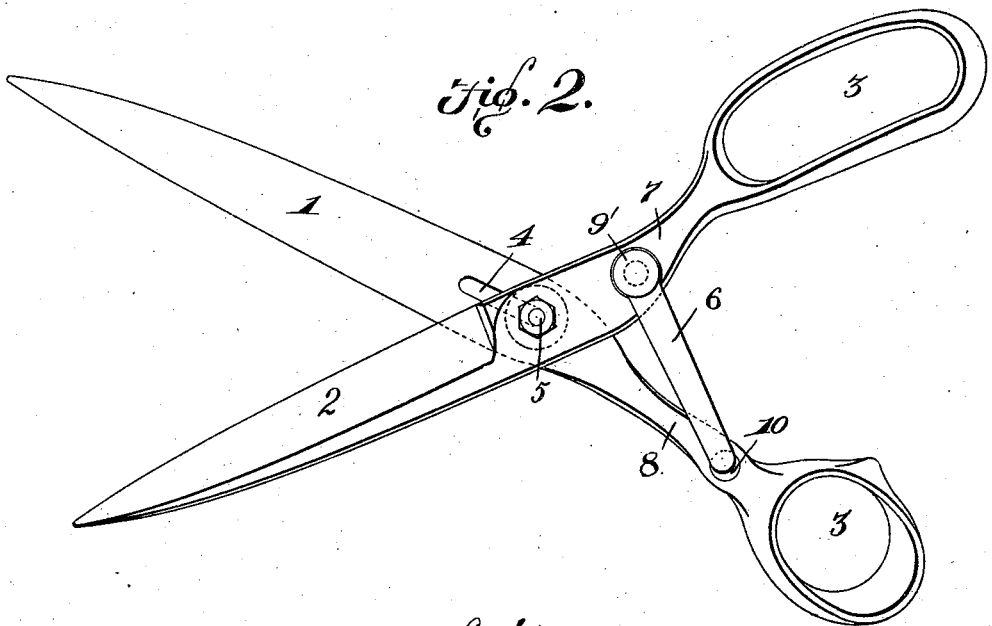
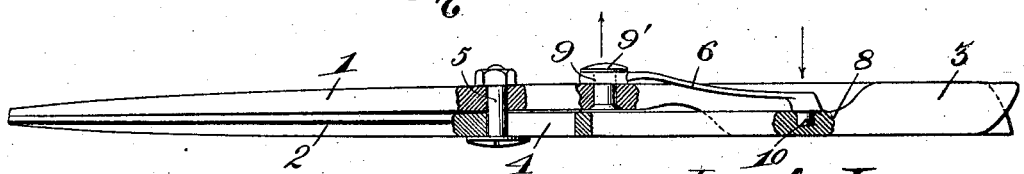
Lee A. Jones,
INVENTOR.
WITNESSES:
By
ATTORNEYS

UNITED STATES PATENT OFFICE.

LEE A. JONES, OF COVINGTON, VIRGINIA.

SHEARS.

No. 846,854.     Specification of Letters Patent.     Patented March 12, 1907.

Application filed May 10, 1906. Serial No. 316,195.

*To all whom it may concern:*

Be it known that I, LEE A. JONES, a citizen of the United States, residing at Covington, in the county of Alleghany and State of Virginia, have invented a new and useful Shears, of which the following is a specification.

The present invention relates to shears, so designed that there is a relative drawing motion accompanying the cutting movement of the blade and that the cutting edges are maintained in perfect contact throughout the length of cut, so that the cutting operation is rendered more easy and attended with better results.

The object of the invention is to provide a pair of shears or scissors of this character which possess simplicity, neatness of design, and are made of few parts, so that they are inexpensive to manufacture and the friction is reduced to a minimum.

With these objects in view the invention comprises the various novel features of construction and arrangements of parts to be more fully described hereinafter in connection with the accompanying drawings and set forth with particularity in the claims appended hereto.

In the accompanying drawing, which illustrates one embodiment of the invention, Figure 1 is a plan view of the shears closed. Fig. 2 is a plan view showing the shears opened, and Fig. 3 is a side elevation showing portions broken away to more clearly illustrate detail parts.

Referring to the drawing, 1 represents the top blade, and 2 the bottom blade, of the shears, each of which has the usual handle or grip 3. The lower blade 2 is provided with a longitudinal slot 4, in which the shank of the rivet 5 is adapted to slide. At a point eccentric to the rivet a lever or member 6, preferably resilient material, is attached to the shank 7 of the top blade 1, and at the opposite end the lever is pivoted to the shank 8 of the under blade at a point adjacent its grip 3. One end of the lever is formed with an eye 9 to engage the pivot 9', which is riveted to the shank 7, as shown in Fig. 3. The opposite end of the lever is formed with a right-angularly-disposed shouldered lug 10, which enters a socket in the shank 8 and is held therein by the tension of the lever. By this arrangement the lever and the top member 1 of the shears form a toggle-joint, which causes the pivot 5 of the shears to move toward and away from the pivot-lug 10 of the lever, thereby producing a relative drawing movement between the blades while the shears are cutting. In addition to causing this drawing movement of the blades the member 6 operates to maintain the cutting edges of the blades in perfect contact throughout the cutting movement of the latter. In order to do this, the member acts as a spring that tends to move the grip portions 3 of the shears away from each other in a plane transverse to their plane of movement, and thus hold the blades together. To explain this in a different way, the member has a tension which tends to cause the eye to move upwardly in the direction indicated by the arrow, Fig. 3, while the pivot end tends to move downwardly, as indicated by the arrow, and since these are connected, respectively, to the shanks of the top and bottom blades the said shanks are acted upon by forces which tend to maintain them apart, so that the blades which are on the opposite sides of the pivot 5 from the shank will be held together. It will thus be seen that the relative drawing movement between the blades and the contact between the cutting edges of the latter are both due to a single element—namely, the member 6, that acts as a spring and as a lever for transmitting the motion.

With shears constructed as described it is obvious that the act of cutting can be accomplished with less effort, since the friction of the parts is reduced materially and the closing of the blades is accompanied with the drawing movement. Furthermore, the edges of the material cut are clean and even by reason of the close contact preserved between the cutting edges of the blades.

I have described the principle of operation of the invention, together with the apparatus which I now consider to be the best embodiment thereof; but I desire to have it understood that the apparatus shown is merely illustrative and that the invention can be carried out by other means.

What I claim as new, and desire to secure by Letters Patent, is—

1. A pair of shears, embodying blade members, and a connection between them for permitting a combined pivotal and longitudinal movement thereof, of a resilient member operatively connected to the blade members at different distances from the connection, and normally operating to maintain the cutting edges of the blade members in coöperative relation and also to produce a relatively longitudinal movement of the blade members when they are relatively turned.

2. The combination with a pair of blade members one having a fulcrum thereon and the other provided with a longitudinal slot adapted to coöperate with said fulcrum to permit a combined pivotal and longitudinal movement of the blade members, of a resilient member having one end connected pivotally to the outer side of one of the blade members and limited to turn in a given plane and having its opposite end bearing against the inner surface of the other blade member, the spring action of the resilient member normally operating to hold the cutting edges of the blade members in coöperative relation, and the relative location of the points of attachment of the resilient member with the blade members causing a relative longitudinal movement of the blade members during their pivotal movement.

3. The combination with a pair of blade members, one having a pivot thereon and the other provided with a longitudinal slot arranged to coöperate with said pivot to permit relative pivotal movement of the blade members and also a longitudinal movement, of a resilient element having a laterally-turned projection at one end arranged to coöperate with a recess at the inside of one of the blade members, and a pivot arranged on the other blade member and coöperating with the other end of the resilient element for permitting the latter to turn in a given plane only, the spring action of said element operating to hold the cutting edges of the blade members in coöperative relation and the relative location of the points of attachment of said element and the blade members serving to produce a relative longitudinal movement of the blade members during their pivotal movement.

4. A pair of shears comprising a blade having an elongated slot, a blade provided with a perforation, a pivot extending through the perforation and slot and forming a fulcrum for the blades, shanks connected with the blades and provided with grips, and a resilient lever extending from one shank to the other and pivotally connected therewith and disposed with one end on the outer surface of one shank and guided to turn in a given plane only and with the other end pressing on the inner surface of the other shank, the spring action of the said lever operating through the shanks to continuously maintain the cutting edges of the blades in contact.

In testimony that I claim the foregoing as my own I have hereto affixed my signature in the presence of two witnesses.

LEE A. JONES.

Witnesses:
EDWARD O'GARA,
H. T. JORDAN.